United States Patent Office 2,763,571
Patented Sept. 18, 1956

2,763,571

NON-FIBROUS REGENERATED CELLULOSE FILM CARRYING AN ANCHORING AGENT AND METHOD OF MAKING

William M. Wooding, Springdale, and Lennart A. Lundberg and Walter F. Reynolds, Stamford, Conn., assignors to American Cyanamid Company, New York, N. Y., a corporation of Maine No Drawing. Application March 23, 1954,
Serial No. 418,214

8 Claims. (Cl. 117—62)

The present invention relates to the coating of non-fibrous regenerated cellulose film. More particularly, the present invention relates to a method of providing non-fibrous regenerated cellulose film with a higher aliphatic amine-epichlorohydrin anchoring medium, whereby a subsequently-applied organic water- and moisture-proofing topcoat is more firmly anchored and made more resistant to sloughing in the presence of water or water vapor. The invention includes non-fibrous regenerated cellulose film bearing the anchoring medium with and without the topcoat.

Non-fibrous regenerated cellulose film is commercially manufactured by extrusion of viscose solution into an aqueous coagulating bath to form a film, clearing and washing the film, passing the film into a plasticizing bath, and drying the plasticized film. Such film is both water-permeable and water-sensitive and cannot be used as wrapping material where moisture resistance is required. Such film is therefore usually provided with an organic moisture-proofing topcoat, usually a lacquer, permitting the product to be used for the packaging of moist substances including foods, or for the packaging of materials which may be subjected to moist conditions.

The organic water-proofing topcoat, if applied directly to untreated regenerated cellulose film, is rapidly sloughed off when in contact with moisture. It is known that this sloughing off can be retarded by first applying a suitable anchoring resin to the regenerated cellulose film, and then applying the topcoat.

Such anchoring material, in the form supplied, should be freely dispersible in water, so as to avoid the cost and hazard presented by organic solvents. It should form a highly moisture-resistant, odorless, and water-clear bond between the cellulose film and the subsequently-applied topcoat. Moreover, the material after application to the film should convert to the desired water-resistant condition sufficiently rapidly to minimize delay in the manufacturing process.

The discovery has now been made that an excellent anchoring medium is provided when non-fibrous regenerated cellulose sheet or film is impregnated with an aqueous dispersion of an epichlorohydrin-amine condensation product such as is made by the condensation of about 1 to 3 mols of epichlorohydrin with 1 mol of an aliphatic primary amine of 14 to 22 carbon atoms, the impregnated film is passed through a dilute alkali bath, preferably aqueous sodium hydroxide, whereby the ionic chlorine necessarily present in the condensation product is neutralized and the sheet is made alkaline, the sheet is washed until substantially neutral, and heated for a few minutes at above about 180° F. until the film is dried and the condensation product is thermally fixed therein. The film is thus provided with an anchoring medium which substantially meets the foregoing requirements and upon which a conventional topcoating material may be applied.

The chemical reactions involved in the reaction of alkylamines with epichlorohydrin indicate that the condensation products referred to should not undergo any appreciable polymerization or "cure" when heated for a short period of time in the film. It is therefore surprising that their effectiveness in anchoring subsequently-applied topcoats is much enhanced, often by a ten-fold or greater increase, when regenerated cellulose films impregnated therewith are heated at about 180° to about 240° F. for only about 2 to 10 minutes. It is possible, however, that removal of the ionic chlorine activates the condensation products so as to permit an actual curing or bonding reaction to take place, and the invention is therefore not limited by any particular theory.

In the specification and claims, the term "fix" is employed to point out that when the film is impregnated, contacted with aqueous sodium hydroxide solution, and heated as described, the effectiveness of the resin in anchoring a subsequently-applied topcoat is at least doubled as compared to the resistance imparted when the film has not been washed or has been heated only to the extent necessary to dry the film.

The condensation products referred to have numerous advantages when used for the purposes described. In the first place, they are auto-dispersible in water and, when so dispersed, are substantially colorless when viewed in bulk. They thus cause no noticeable alteration in color even to untinted regenerated cellulose film.

Moreover, the products contain substantially no volatile matter. As a result, film impregnated therewith does not develop any objectionable odor.

Further, the action of the alkali metal hydroxide solution takes place practically instantaneously, for example, within 1–3 seconds or less. As a result, the process permits normal high machine speeds.

A particular advantageous feature is that the anchoring resin bath is not sensitive to the presence of polyvalent anions, such as the anions normally present in water as well as those delivered to the bath by freshly-formed film. As a result, the bath is particularly adaptable for use in the continuous commercial process for the manufacture of cellulosic film.

Moreover, the anchoring resin of the present invention is compatible with the non-ionic water-soluble polyhydric alcohols commonly used for the plasticization of regenerated cellulose, such as glycerol, and may be mixed therewith especially when the solution is predominantly aqueous, that is, when it contains more than 50% of water. Hence the steps of plasticizing the film and impregnating the film with the anchoring resin may be combined, thus eliminating a step which would otherwise be necessary. The alkali solution and the subsequent wash remove a part of the plasticizer, and therefore in commercial practice the film is best treated consecutively by impregnating it with first the condensation product, then contacting it with the hydroxide solution, then washing the film, and finally by passing the film through a plasticizing bath.

It is a particular advantage that the condensation products themselves are prepared from readily available raw materials by a simple reaction for which no delicate controls are employed, and that they need no aging or pH adjustment before use.

According to a preferred embodiment of the present invention, regenerated cellulose film in wet swollen condition is passed through an aqueous dispersion containing between 0.05% and 3% of one of the condensation products of the present invention for from 3–5 seconds to 5 minutes until a desired amount of the product has been adsorbed, passed through a 1% sodium hydroxide solution for 2 seconds or until alkaline, and then through water for 2 seconds until neutral. The film is then plasticized by passage through any of the common plasticizing baths. The film, when thus impregnated, normally carries about 0.1% to 6% by weight of the condensation product, and is then passed over drying drums at about 180°–240° F. for 2 to 10 minutes until fixing of the condensation product in the regenerated cellulose has become substantially complete.

The film thus produced is substantially neutral and consists essentially of non-fibrous regenerated cellulose impregnated with between about 0.1% and 6% of its weight of a fatty amine-epichlorohydrin condensation product fixed therein.

An organic moisture-proofing topcoat is then applied by known means, after which the film is preferably heated to dry the topcoat and to bond the topcoat to the anchoring condensation product.

The final film thus consists essentially of the foregoing impregnated film bearing topcoat material on either or both sides.

The foregoing procedure may be varied, and such variations are within the scope of the present invention.

The anchoring condensation product of the present invention are of complex formulae and are therefore best described in terms of their composition.

The higher aliphatic amine-epichlorohydrin condensation products used in practicing the invention are obtained by heating either an aliphatic primary amine or a salt thereof with a quantity of epichlorohydrin sufficient to form a condensation product containing from 1 to 2 mols of combined epichlorohydrin for each mol of aliphatic amine. When epichlorohydrin and a free higher aliphatic amine are used, the proper proportion of reagents to be mixed together is from equimolecular quantities up to slightly more than 2 mols of epichlorohydrin for each mol of amine. When amine salts are used the molar ratio of epichlorohydrin can be considerably higher, extending up to about 3:1. The fact appears to be that no more than 2 mols of epichlorohydrin can be reacted with 1 mol of a free higher aliphatic monoamine such as octadecylamine, regardless of the excess of epichlorohydrin in the reaction mixture, the unreacted epichlorohydrin appearing to form glycerol dichlorohydrin that does not function as an anchoring medium. To react a larger proportion of epichlorohydrin the amine should be in the form of its salt.

In general, therefore, the condensation products suitable for use in practicing the invention are those containing from 1 to 2 mols of epichlorohydrin condensed with 1 mol of a higher aliphatic primary amine or amine mixture having an average molecular weight corresponding to a hydrocarbon chain length of from 16 to 22 carbon atoms. While the presence of unsaturated aliphatic chains, up to about 50%, have tolerated well, the preferred monoamines used are the saturated or alkylamines of about 16–18 carbon atoms, since these are obtainable commercially at reasonably low cost and give the best anchoring effect.

The synthesis of the preferred resins is most conveniently accomplished by the use of an inert solvent such as a lower alkanol and by employing a salt of the amine, preferably the hydrochloride which provides a product which is readily soluble in water. The amine is preferably dissolved in the solvent, hydrochloric or other acid added, and the epichlorohydrin added at such a rate that the temperature does not rise above about 90° C. After all the epichlorohydrin has been added, preferably about 2–3 mols per mol of amine, the solution is heated at least until a desired amount of epichlorohydrin has reacted but not so long as to form a product which is indispersible in hot water. The solvent can then be removed by distillation at reduced pressure, together with any unreacted epichlorohydrin, and the anchoring medium obtained as a soft, waxy material. In carrying out the condensation, care should be taken to use mild conditions such as temperatures not materially higher than 100° C., higher temperatures being detrimental to the dispersibility and anchoring effectiveness of the products. If the reaction is carried out for too long a time or if excessively high temperatures are used, the product becomes unduly difficult to apply to regenerated cellulose film by the bath impregnation method.

The condensation products obtained by reaction of the free amines with about 1 to 2 mols of epichlorohydrin are polymers which are essentially linear in structure and contain quarternary ammonium groups. The condensation products obtained by reaction of the amine salts with about 2 to 3 mols of epichlorohydrin likewise contain quarternary ammonium groups, but are essentially of monomeric molecular dimension and are probably predominantly compounds such as octadecyl tri(2-hydroxy-3-chloropropyl)ammonium chloride. Both types of products contain ionic chlorine derived from the chlorine of the epichlorohydrin on reaction with the amine. The essentially monomeric products containing substantial amounts of quaternary ammonium groups, produced by reaction of about 2 to 3 mols of epichlorohydrin with an amine salt, give best bonding action and are therefore preferred. Both types are auto-dispersible in water forming hazy or milky dispersions, and do not form clear solutions therewith.

In the reaction a substantial excess of epichlorohydrin may be employed and any unreacted epichlorohydrin distilled off with the solvent. The excess does no harm as experience shows that it is difficult to cause materially more than 3 mols of epichlorohydrin to react with the amine while obtaining a water-dispersible product.

Advantageously, the condensation products are dispersed in water to facilitate metering for preparation of the anchoring bath. The dispersions are colorless, and may be used without further treatment.

The practice of the process of this invention can be extended so as to include the treatment of a variety of non-fibrous cellulosic films. It may be applied to films of regenerated cellulose prepared from solutions of cellulose xanthates, cuproammonium cellulose, cellulose nitrate, cellulose acetate, cellulose acetobutyrate, and the like.

Amongst those water-repellent topcoats which may be used in the final treatment of the cellulosic films after they have been subjected to treatment in the anchoring bath, are those coating compositions containing as the film-forming constituent nitrocellulose, cellulose acetate, methyl cellulose, deacetylated chitin, rubber, chlorinated rubber, rubber hydrochloride, ethyl cellulose, butyl methacrylate, moisture-resistant lacquers, waxes such as montan wax, beeswax, carnauba wax, and other conventional film-forming water-proofing materials.

It will be understood that the topcoat is not necessarily a continuous film. It may consist of printed legends, revenue stamps, or decorative matter.

The invention has been set forth above. It will be illustrated by the following examples. These examples represent only specific embodiments of the invention and are not to be construed in limitation thereof.

*Example 1*

650 cc. of ethanol was placed in a reaction flask equipped with thermometer, dropping funnel, stirrer, and reflux condenser, heated to 65° C. on a steam bath, and 496 g. (1.84 mols) of a commercial octadecylamine dissolved therein. The amine contained about 2% of unsaturates and some hexadecylamine. The amine was neutralized with 1.84 mols of concentrated aqueous HCl. There was then added slowly over 45 minutes 511 g. (5.52 mols) of epichlorohydrin, after which the mixture was heated for four hours at 83° C. The mixture was vacuum concentrated to remove the ethanol, a soft, tan wax being obtained, the wax being a low molecular weight three-dimensional condensate containing quaternary ammonium groups, probably predominantly octadecyl tri-(3-chloro-2-hydroxypropyl)ammonium chloride. A sample was dispersed by stirring with hot water to 5% solids concentration. This sample was milky in appearance and was cationic and colloidal.

Example 2

The foregoing condensation product was tested as follows so as to illustrate the beneficial effect of contacting the impregnated film with dilute sodium hydroxide solution.

Wet swollen, non-fibrous regenerated cellulose film was soaked in water until all solubles had dissolved and a plasticizing-anchoring bath was prepared by forming an 8.0% by weight solution of glycerol in deionized water containing 1% by weight of the condensation product of Example 1.

One set of sheets of the wet swollen, non-fibrous regenerated cellulose film was immersed in the plasticizing-anchoring solution for five minutes, and dried for 2 or 10 minutes as shown in the table below at 200° F. on a chrome-plated brass sheet provided with a clamping frame.

The foregoing procedure was repeated with a second set of sheets except that after immersion in the plasticizing-anchoring solution the sheets were dipped into a 0.2% sodium hydroxide solution, and then dipped into water to remove excess materials.

When dry, all films were immersed in a standard nitrocellulose topcoat lacquer solution prepared as described in U. S. Patent No. 2,394,009, drained, air-dried for 1 hour, and further dried at 210° F. for 2 minutes or 10 minutes as shown in the table below. All films were flexible, odorless and water-clear.

Strips were cut from all the sheets, all the edges of the strips being freshly cut, and the strips were subjected to the standard accelerated slough test in sets of three, wherein they are immersed in water at 180°–190° F., and tested every 10 minutes for sloughing by rubbing with moderate pressure between two fingers, and the results averaged.

| Sample | Anchoring Resin In Bath, percent | Drying Time [1] | Caustic Wash | Minutes to Slough [2] |
|---|---|---|---|---|
| A | 1 | 2 | No | 2 |
| B | 1 | 2 | Yes | 22 |
| C | 1 | 10 | No | 5 |
| D | 1 | 10 | Yes | [3] >60 |

[1] Minutes at 200° F.
[2] In water 180°–190° F.
[3] Sheets apparently not affected in any way by test.

These tests show that the sodium hydroxide dip, followed by the wash, increased the resistance of the film to sloughing by a factor of more than 12.

Example 3

The procedure of Example 2 was repeated, except that the films were treated in separate anchoring and plasticizing baths.

Wet swollen sheets of regenerated cellulose film were first immersed in a 1% aqueous dispersion of the condensation product of Example 1 as anchoring bath for 5 minutes, dipped into a 1% aqueous sodium hydroxide solution, rinsed with water, and finally immersed in an 8% aqueous glycerol solution as plasticizing bath for 5 minutes. The films were then dried at 200° F. for 10 minutes, and were found to be somewhat better plasticized than the dried films of Example 2. They were substantially unaffected by immersion in water at 180°–190° F. for 60 minutes.

We claim:

1. A substantially neutral non-fibrous regenerated cellulose film impregnated with a condensation product of 1 to 3 mols of epichlorohydrin and 1 mol of an aliphatic linear primary monoamine containing 14 to 22 carbon atoms.

2. A substantially neutral non-fibrous regenerated cellulose film impregnated with a condensation product of 2 to 3 mols of epichlorohydrin and 1 mol of an alkylamine containing 14 to 22 carbon atoms.

3. A film according to claim 2, wherein the amine contains 16 to 18 carbon atoms.

4. A film according to claim 3, wherein the condensation product is thermally fixed in the film.

5. A method of providing a non-fibrous regenerated cellulose film with an anchoring medium adapted to improve adhesion of a subsequently-applied topcoat, which comprises impregnating wet swollen, regenerated cellulose film with an aqueous solution of a condensation product of about 1 to 3 mols of epichlorohydrin and 1 mol of an aliphatic linear primary monoamine of 14 to 22 carbon atoms, contacting the impregnated film with a dilute aqueous alkali metal hydroxide solution until the film has an alkaline pH, and washing with water until the film is substantially neutral.

6. A process according to claim 5, wherein the film is impregnated with a condensation product of about 2 to 3 mols of epichlorohydrin and 1 mol of a primary alkyl amine hydrochloride of 16 to 18 carbon atoms.

7. A process according to claim 5, wherein the alkali metal hydroxide solution is a 0.2%–2% aqueous sodium hydroxide solution.

8. A method of providing a non-fibrous regenerated cellulose film with an anchoring medium adapted to improve adhesion of a subsequently-applied topcoat, which comprises first impregnating the film with an aqueous solution of a condensation product of about 2 to 3 mols of epichlorohydrin and 1 mol of a primary alkyl amine hydrochloride of 14 to 22 carbon atoms, contacting the impregnated film with a dilute aqueous alkali metal hydroxide solution until the film has an alkaline pH, washing the film with water until the film is substantially neutral, and heating the film at a temperature between about 180° F. and 240° F. to dry the same and thermally fix the condensation product therein.

References Cited in the file of this patent

UNITED STATES PATENTS 2,573,956    Daniel    Nov. 6, 1951